(12) United States Patent
Chauquet

(10) Patent No.: US 6,764,597 B2
(45) Date of Patent: Jul. 20, 2004

(54) EXTERNAL TANK FILTER, IN PARTICULAR FOR AN AQUARIUM

(75) Inventor: Jacques Jean Chauquet, Bonneville (FR)

(73) Assignee: Rena S.A. (FR)

( * ) Notice: Subject to any disclaimer, the term of this patent is extended or adjusted under 35 U.S.C. 154(b) by 0 days.

(21) Appl. No.: 10/275,354

(22) PCT Filed: May 2, 2001

(86) PCT No.: PCT/FR01/01342

§ 371 (c)(1),
(2), (4) Date: May 22, 2003

(87) PCT Pub. No.: WO01/82686

PCT Pub. Date: Nov. 8, 2001

(65) Prior Publication Data

US 2003/0178353 A1 Sep. 25, 2003

(30) Foreign Application Priority Data

May 2, 2000 (FR) .............................................. 00 05590
May 2, 2001 (FR) ............................................ 01 01342

(51) Int. Cl.[7] ........................ A01K 63/04; B01D 35/26; B01D 36/00
(52) U.S. Cl. .................... 210/169; 210/416.1; 210/436; 210/472; 119/259
(58) Field of Search ................................ 210/169, 232, 210/436, 416.1, 472, 416.2; 119/259

(56) References Cited

U.S. PATENT DOCUMENTS 4,867,874 A * 9/1989 Aubert et al. ............... 210/169
5,294,335 A    3/1994 Chiang
5,449,454 A    9/1995 Hickok
5,474,674 A * 12/1995 Bresolin et al. ............. 210/169
5,567,315 A * 10/1996 Weidenmann et al. ...... 210/123
5,603,831 A *  2/1997 Hickok ........................ 210/601
6,106,709 A *  8/2000 Bresolin ...................... 210/169

FOREIGN PATENT DOCUMENTS

EP            0 619 070       10/1994

OTHER PUBLICATIONS

International Search Report, PCT/FR01/01342, Jul. 25, 2001.

* cited by examiner

Primary Examiner—Fred G. Prince
(74) Attorney, Agent, or Firm—Cantor Colburn LLP

(57) ABSTRACT

A filter external to a tank, including a vessel, a lid for closing the vessel, a basket disposed in the vessel for housing filtering components, a top wall bearing sealingly in a central part of the lid allowing communication with the central part, a water-circulating pump disposed in the central part, and means for automatically removing air from a water delivery side, wherein the water is conveyed through the lid by first piping passing through the lid, the water moving down into the vessel on an outside of the basket, entering the basket via a bottom of the basket, passing upward through the basket over the filtering components and leaving the basket at a top of the basket in the central part to be sucked up by the pump and delivered to second piping passing through the lid toward a pipe delivering to the tank.

6 Claims, 1 Drawing Sheet

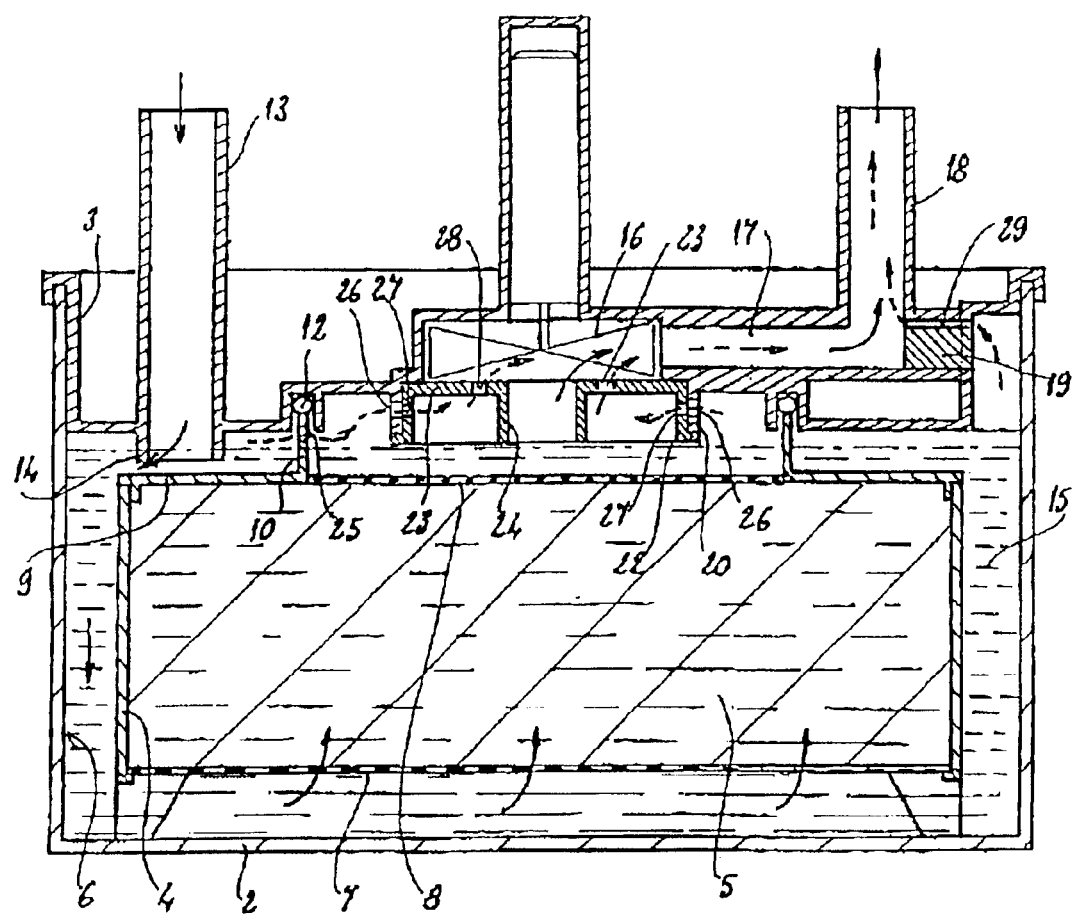
Single Fig.

EXTERNAL TANK FILTER, IN PARTICULAR FOR AN AQUARIUM

FIELD OF INVENTION

DESCRIPTION OF RELATED ART

Aquariums are generally equipped with an air pump which encourages the settling of microparticles, and possibly with a carbon dioxide generator which encourages the growth of plants contained in the aquarium. These bubbles are drawn in by the water pump, which circulates water through the filter, and expand in the filter. This air or this gas lowers the water level and may cause the impeller blades to come out of the water, giving rise to a cavitation phenomenon, then cause suction to stop and place the installation in a situation where prime is lost. Furthermore, in the event of a power cut or a stopping of the filter, for example while food is being distributed to the fish, the air trapped in the vessel tends to leave this vessel and tends to follow the easiest path. If air gets into the suction side, the siphoning conditions are eliminated and the filter will no longer be able to restart.

SUMMARY OF INVENTION

A filter external to a tank is provided which can operate without additional noise resulting from cavitation of the pump as a result of the presence of a water and air emulsion, which can restart without problems and without risk of losing its prime after a stoppage due to a power cut or to a deliberate interruption resulting, for example, from the cleaning of the filter.

To this end, the filter to which it relates, of the type comprising a vessel sealingly closed by a lid, the vessel containing at least one basket acting as a housing for filtering components and comprising a top wall bearing sealingly in the central part of the lid and allowing communication with this central part which contains a water-circulating pump, the water being conveyed through the lid by piping passing through the latter, moving down into the vessel on the outside of the basket, entering the basket via its bottom, passing upward through the basket over the filtering components and leaving the basket at the top and in the central part thereof to be sucked up by the pump and delivered to piping passing through the lid toward the pipe delivering to the tank, comprises means for automatically removing air from the water delivery side. As any air that might be contained in the filter is removed automatically from the delivery side, the suction side always has a head of pressure which means that the pump operates normally, without cavitation and without the risk of losing its prime, as soon as it is switched on.

According to one characteristic of this filter, in which the top wall of the basket comprises a collar delimiting a water outlet opening and intended to bear in a groove of the lid, sealing being afforded by a seal, the collar has at least one radial opening. This arrangement gives an air passage at the top of the filter and at a peripheral part thereof, toward the suction zone.

It has been noted that if there is air in the suction zone, particularly in the zone situated near the suction shaft, a residual pocket of air that cannot be reabsorbed is formed.

To remedy this disadvantage, in the filter according to the invention, comprising a suction intake arranged in the interior wall of the lid and comprising a cylindrical component which is mounted in a collar integral with the lid and the central part of which comprises a suction shaft, the collar has at least one through-slot arranged facing an opening in the cylindrical component when the latter is in the position mounted in the collar. Furthermore, the cylindrical component comprises an end wall connecting its peripheral part to the suction shaft, in which end wall at least one hole is made. It is thus possible, at the periphery of the suction shaft, to recover the air which lies in the upper part, and for this air to be removed parallel to the suction shaft to prevent it from building up in this zone with the ensuing disadvantages.

DETAILED DESCRIPTION OF INVENTION

When the pump is stopped, air may lie under the lid. It is therefore important to remove this air. To this end, in the filter according to the invention, in which the delivery tube comprises a roughly horizontal part at the pump outlet, directed outward, continued by a vertical part passing through the lid, an orifice forming an air intake communicating with the inside of the vessel opens in the upper part of the horizontal tube where it joins the vertical tube. Furthermore, the piping letting water into the vessel protrudes from the lid toward the inside of the vessel, so as to dip into the water. In this case, as soon as the pump stops, air escapes through the orifice forming an air tapping communicating with the delivery piping, it not being possible for the air to escape on the inlet piping side given that the end of this piping dips into the water. All the air contained between the casing of the vessel and the water level, that is to say in the pressure chamber, in any lateral housings of the casing, in the piping for removing water to the delivery side, in the baskets, under the lid of the basket, is removed freely from the delivery side, avoiding the risk of the suction side losing its prime when the apparatus is switched back on.

In any event, the invention will be clearly understood with reference to the single FIGURE of the attached diagrammatic drawing which, by way of nonlimiting example, depicts one embodiment of this filter.

DESCRIPTION OF THE DRAWINGS

The filter depicted in the drawing comprises a vessel 2 to which a lid 3 is sealingly fixed. The vessel contains a basket 4, inside which are arranged filtering elements denoted by the general reference 5. This basket with the vessel delimits a peripheral space 6 allowing water to move downward, the water then passing through the bottom 7 of the basket which is perforated, passing upward through the filtering elements 5 and leaving via the central part 8 of the lid 9 of the basket, this perforated central part being delimited by a collar 10 bearing in a groove of the lid, with the insertion of a seal 12. The lid 3 has, passing through it, water inlet piping 13 which opens outside of the collar 10 of the basket, the end 14 of the piping, on the side inside the filter, protruding from the lid so as to be immersed in the liquid 15. The central part of the lid contains a motor intended to suck up the water, the impeller 16 of which is depicted in the drawing. The water sucked up is delivered by a portion of horizontal piping 17 continued by a vertical portion of piping 18 which passes through the lid. The portion 17 opens laterally, for reasons of the molding of the synthetic material, the open end of the piece of tube 17 being plugged by a stopper 19. Arranged facing the impeller 16 is a collar 20 projecting from the lid toward the inside of the filter, this collar 20 serving to house a cylindrical component 22, part of which bears against the collar 20 and is continued by an end wall 23 which bears a central suction shaft 24.

According to the essential feature of the invention, these various components comprise orifices or slots allowing residual air to pass to the delivery side. These are in particular an opening 25 formed in the collar 10 protruding from the upper part of the basket, openings 26, 27 formed respectively in the collar 20 and in the cylindrical component 22, the openings 26, 27 coinciding and there being two pairs of them. These are also two holes 28 formed in the end wall 23 and an orifice 29 formed in the upper part of the stopper 19 so as to place the upper part of the vessel in communication with the delivery tube 18. Thus, any air or gas which may be sucked up by the vessel is removed on the delivery side, and any air which builds up when the apparatus is not running is also removed automatically and immediately from the delivery side, so that water is always present on the inlet side, avoiding any risk of the pump losing its prime upon switch-on.

As goes without saying, the invention is not restricted to the sole embodiment of this filter described hereinabove by way of example; on the contrary, it encompasses all alternative forms thereof. Thus, in particular, there could be a different number of openings and slots, or just some of the openings or slots could be present, without in any way separating from the scope of the invention.

What is claimed is:

1. A filter external to a tank, comprising:

a vessel;

a lid for closing the vessel;

a basket disposed in the vessel for housing filtering components;

a top wall bearing sealingly in a central part of the lid allowing communication with the central part;

a water-circulating pump disposed in the central part; and means for automatically removing air from a water delivery side; wherein the water is conveyed through the lid by first piping passing through the lid, the water moving down into the vessel on an outside of the basket, entering the basket via a bottom of the basket, passing upward through the basket over the filtering components and leaving the basket at a top of the basket in the central part to be sucked up by the pump and delivered to second piping passing through the lid toward a pipe delivering to the tank.

2. The filter as claimed in claim 1, wherein the top wall of the basket comprises a collar delimiting a water outlet opening for bearing in a groove of the lid, sealing being afforded by a seal, the collar having at least one radial opening.

3. The filter as claimed in claim 1, comprising a suction intake arranged in an interior wall of the lid and comprising a cylindrical component which is mounted in a collar integral with the lid, the central part comprising a suction shaft, wherein the collar has at least one through-slot arranged facing an opening in the cylindrical component when the cylindrical component is in the position mounted in the collar.

4. The filter as claimed in claim 3, wherein the cylindrical component comprises an end wall connecting a peripheral part to the suction shaft, at least one hole being formed in the end wall.

5. The filter as claimed in claim 1, wherein the second piping comprises a substantially horizontal part at a pump outlet, directed outward, a vertical part passing through the lid, and an orifice forming an air intake communicating with an inside of the vessel, the orifice opening in an upper part of the horizontal tube where the horizontal tube joins the vertical tube.

6. The filter as claimed in claim 5, wherein the first piping letting water into the vessel protrudes from the lid toward the inside of the vessel, so as to dip into the water.

* * * * *